Oct. 16, 1962     F. S. CAMPBELL     3,058,698
RADIO BEAM COUPLER
Filed Nov. 29, 1960
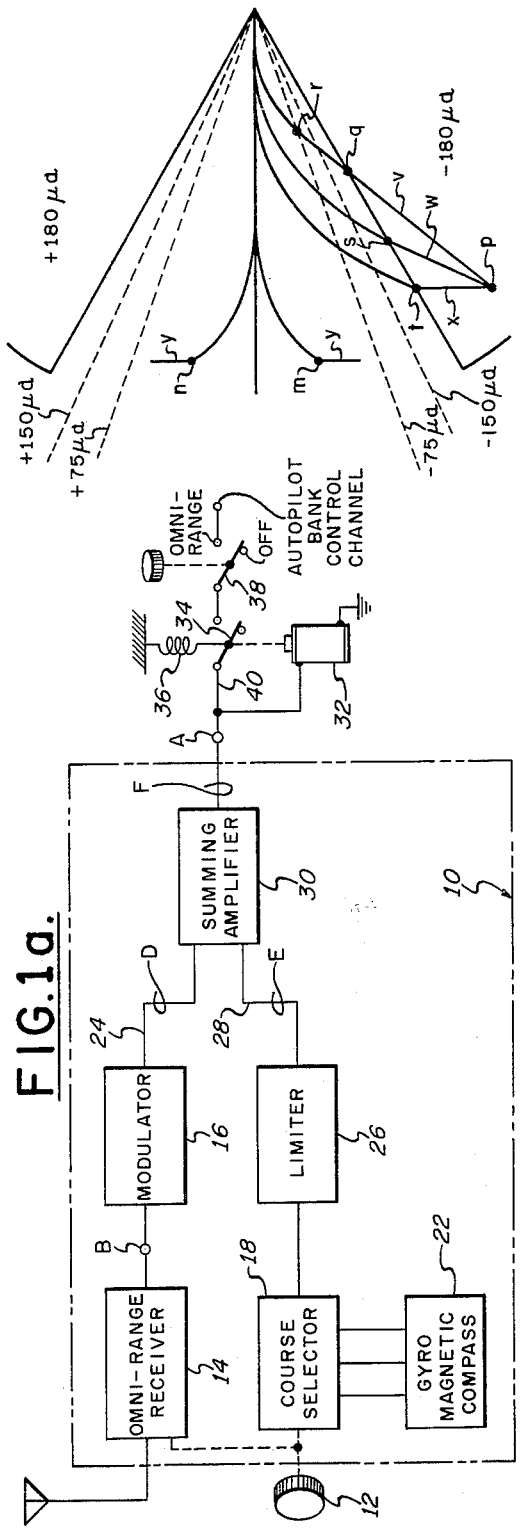
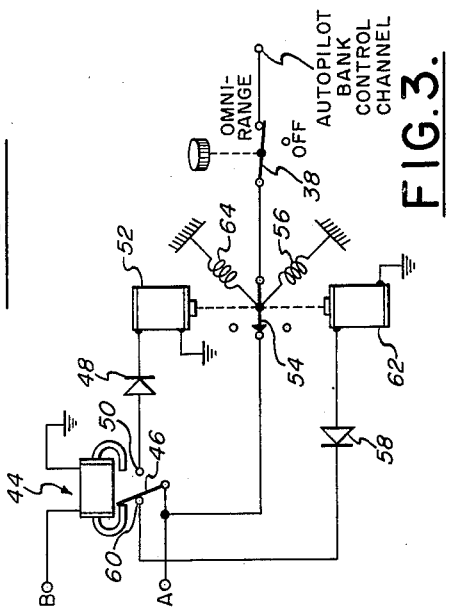
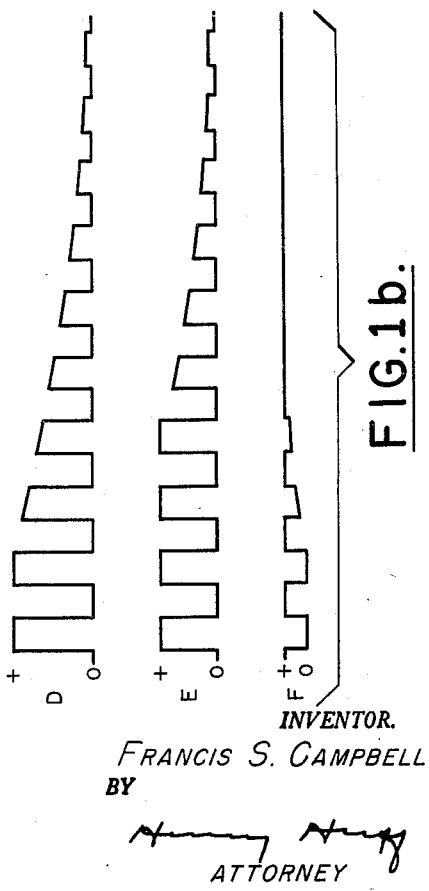
INVENTOR.
FRANCIS S. CAMPBELL
BY
ATTORNEY

United States Patent Office 3,058,698
Patented Oct. 16, 1962

3,058,698
RADIO BEAM COUPLER
Francis S. Campbell, Commack, N.Y., assignor to Sperry Rand Corporation, Great Neck, N.Y., a corporation of Delaware
Filed Nov. 29, 1960, Ser. No. 72,357
15 Claims. (Cl. 244—77)

This invention relates generally to automatic flight control apparatus and more particularly to apparatus for use in controlling such apparatus by means of radio navigation aids such as VOR and ILS systems. More specifically, the invention is devoted to improvements in apparatus for automatically engaging the autopilot for control by such aids.

Generally, coupling onto a radio defined course is accomplished by comparing a signal representing the craft displacement from the course with a signal proportional to the craft approach rate and applying the difference signal produced by this comparison to the bank or turn channel of the autopilot. The autopilot then varies the craft approach rate until the approach rate signal equals the course displacement signal. Since the craft displacement from the course gradually approaches zero, the approach rate adjustments by the craft autopilot cause the craft to fly an asymptotic approach to the radio defined course.

When a pilot desires to couple onto a radio beam, he flies his craft along a course which intersects that beam. At a predetermined craft displacement from the center of the beam, a beam sensing relay is actuated and applies the aforementioned difference signal to the craft autopilot which, from that moment on, directs the craft so that it asymptotically approaches the beam center. When the beam sensing relay applies the difference signal to the craft autopilot, the autopilot changes the craft approach rate so that the approach rate signal cancels the beam displacement signal. If, prior to activating the beam sensing relay, the craft had been approaching the beam rapidly, i.e. at a large angle relative to the beam, the craft autopilot would have to turn the craft abruptly inbound in order to produce an approach rate signal which cancels the beam displacement signal. However, if the craft had been approaching the beam slowly, i.e. making a shallow approach to the beam, the craft autopilot would have to turn the craft abruptly outbound in order to cancel the beam displacement signal.

Outbound turns during the bracketing maneuver are objectionable because they lengthen the time it takes to bracket the beam, cause the craft to overshoot the beam, and cause the craft to fly in a direction generally contrary to the direction selected by the pilot. Apparatus embodying the present invention makes it impossible for a craft which is performing a beam bracketing maneuver to make an outbound turn, regardless of the craft approach course relative to the beam. Generally, apparatus embodying the invention eliminates the prior art beam sensing relay and, instead, utilizes a relay which operates to apply the aforementioned difference signal to the craft autopilot only when the displacement and approach rate signals are equal. In this way, the approach coupler or radio controls can never become engaged while the approach rate signal is less than the displacement signal: a condition requiring an outbound turn. When the approach rate signal is small, the craft will fly well into the beam before a displacement signal equal to the approach rate signal is produced. Then, the autopilot will be engaged and the craft will turn inbound.

In addition to the prevention of outbound turns during the beam bracketing maneuver, apparatus embodying the invention provides a floating coupler engage point, i.e. the autopilot is engaged at different craft displacements from the beam center depending on the craft approach rate to the beam center. At extremely fast approach rates, which require a long time to couple onto the beam because of overshooting, the coupler is engaged early. This is because a displacement signal which equals the fast approach rate signal is provided at a large displacement from the beam center. At slow approach rates, which require a short time to couple onto the beam, the radio coupler is engaged late. This engage technique is clearly superior to the earlier described prior art technique which completely disregards the craft approach rate to the beam and engages the craft autopilot only when a particular beam displacement has been detected.

A principal object of the invention is to provide improved flight control apparatus for automatically coupling to a radio defined course.

Another object of the invention is to provide aircraft beam bracketing equipment wherein the point at which the craft radio controls are engaged is varied as a function of the craft approach rate to the beam.

The invention will be described with reference to the drawings, of which:

FIG. 1a is a schematic diagram of a circuit embodying the invention,

FIG. 1b is a graphic representation of certain signals produced in the circuit of FIG. 1a, FIG. 2 is a diagram depicting different courses that may be effected with apparatus embodying the invention, and FIG. 3 is a schematic diagram of a circuit which, when substituted for a part of the circuit of FIG. 1, provides another embodiment of the invention.

Referring to FIG. 1, a circuit 10, which produces a signal representing the difference between a signal representing the displacement of an aircraft from a radio defined course and a signal representing the craft rate of approach to the course, is provided with a knob 12 for selecting an omni-range radial along which the pilot wishes to fly. Simultaneously, the knob 12 may select a reference heading corresponding to the omnibearing selected as shown at 18 in FIG. 1. An omni-range receiver 14 produces a D.C. signal representing the craft displacement from the selected omni-range radial and has its output signal applied to a modulator 16 wherein it is converted to an A.C. signal as shown on lead 24. The heading or course selector 18 provides an A.C. signal representing the error between the actual heading of the craft and the selected heading which, in the present case, corresponds to the omnibearing selected. The magnetic heading reference for the system may be a conventional gyro-magnetic compass system 22. The apparatus schematically illustrated at 12, 14, 18 and 22, may be of the type shown in U.S. Patent No. 2,732,550, which is assigned to the same assignee as the present application, or any other suitable means for providing a signal representing the displacement of the craft from a selected VOR radial or other radio beam as well as a signal which varies in accordance with the error between the actual heading of the craft and the bearing of the selected VOR radial or radio beam. The compass 22 applies its output signal, which is proportional to the actual magnetic heading of the craft, through a conventional synchro data network to the stator of a synchro receiver, the knob 12 positioning the synchro receiver rotor so that the signal appearing on the rotor output will represent the desired heading error signal.

A limiter 26 receives the output signal from the course selector 18 and operates to provide a signal such as that shown at E in FIG. 1b, which appears on the conductor 28. Limiting is necessary to keep the relative bearing signal from exceeding the displacement signal, a condition which would prevent the autopilot from ever becoming engaged as will be hereinafter more fully explained. The output signals from the modulator 16 and the limiter 26 are applied to a summing amplifier 30 which operates to produce either positive- or negative-going pulses which represent the difference between the heading error signal and the radio displacement signal. The output pulses from the summing amplifier 30 are then applied to an A.C. relay 32 which operates in response to the A.C. component of the pulses. If preferred, the A.C. relay 32 may be replaced by a pair of slow-acting D.C. relays wherein one of the relays responds to negative-going pulses to open a switch between the autopilot and the summing amplifier 30 and the other relay responds to positive-going pulses to open a different switch in series with the first switch, the second switch also being located between the autopilot and the summing amplifier 30. When the relay 32 is energized, it opens the switch 34 against the tension of the spring 36. However, when the modulator 16 and limiter and signal shaper 26 signals are equal, the summing amplifier 30 does not have an output signal. Therefore, the relay 32 becomes deenergized and the switch 34 closes. A switch 38 is connected in series with the switch 34 and must be closed when the pilot wishes to couple onto a radio beam. With both switches 34 and 38 closed, the summing amplifier 30 is connected to the bank or other turn control channel of the autopilot. As the craft approaches the beam center with the switches 34 and 38 closed, the displacement signal on line 24 starts to get smaller than the heading error signal, thereby causing a difference signal to start to appear on the line 40. However, as soon as this happens, the autopilot which is connected to the line 40 decreases the heading error before the relay 32 can again be energized. This causes the craft heading to be gradually changed until the aircraft is flying along the selected radial.

Without departing from the scope of the invention, the above described circuit arrangement may be easily modified to include two summing amplifiers arranged in parallel, each of which sums the signals on lines 24 and 28. Then, one sum signal could be applied to operate a relay applying the other sum signal to the autopilot bank control channel. This arrangement has the advantage of enabling the respective sensitivities of the displacement and heading error signals to be adjusted individually for controlling the turning of the craft.

Referring to FIG. 2, the displacement signals are shown gradually increasing up to maximum levels of ±180 microamperes which is approximately the maximum output of VOR receivers. With the craft at position $p$ and moving along a course $v$, the displacement signal and heading error signal will remain constant but unequal (see FIG. 1) until the craft reaches the point $q$. At position $q$, the displacement signal starts to diminish in amplitude, but the heading error signal continues to remain constant because the coupler is disengaged and the craft will continue on its initial heading. When, finally, the craft reaches the position $r$, where the displacement signal has the same amplitude as the heading error signal, the output summing amplifier 30 drops to zero. This causes the relay 32 to be deenergized, thereby closing the switch 34 and connecting the summing amplifier 30 to the autopilot bank control channel. As the craft continues to approach the beam center, the displacement signal starts to decrease below the heading error signal. However, as soon as this occurs, the summing amplifier 30 produces an output signal which starts to go positive. This causes the craft to make a right turn, i.e. inbound, to keep the displacement and heading signals equal, thereby preventing the relay 32 from being energized.

With the craft moving along a course $w$ having a greater intercept angle than course $v$, the coupler parameters are so selected that the heading error signal equals the displacement signal. Therefore, the switch 34 is held closed and the coupler is engaged. However, the autopilot does not alter the craft course until the point $s$ is reached, at which time the displacement signal starts to diminish below the heading error signal. Thereafter, craft is directed by the autopilot turn control as described above. If the craft approach angle at point $p$ is increased still further, so that the craft flies along a course $x$, the heading error signal will, unless it is limited, be always greater than the craft displacement signal (which can only decrease). This would cause a signal to be applied to the relay 32, thereby preventing the radio controls from ever becoming engaged. It is for this reason that the heading error signal is limited so that it can never exceed the maximum possible displacement signal. With the heading error signal limited, the radio coupler is engaged all along the course $x$ and, at position $t$, the autopilot again changes the craft heading as described above to thereafter proceed along an asymptotic approach path to the beam center.

As can be appreciated from FIG. 2, the coupler engage point varies as a function of the craft heading with respect to the beam heading. For shallow approaches to the beam, the engage point is relatively near the center of the beam (point $r$). As the steepness of the approach increases, the engage point occurs further and further away from the beam center until, finally, the coupler is engaged for all approaches steeper than a certain amount. However, even though the autopilot is always engaged during these steep approaches, the craft is not turned until the radio receiver output drops below, for example, 180 microamperes. This prevents the craft which is steeply approaching the beam in close to apex of the beam from turning too soon and possibly missing the beam entirely.

With the apparatus of FIG. 1, the radio coupler will not become engaged under a remote, though possible, combination of conditions. For example, if the craft has entered the beam and is steeply approaching the beam center, i.e. with a heading error which produces a signal that is greater than the displacement signal, when the switch 38 is closed, the relay 32 will remain energized and the coupler will be prevented from being engaged. To prevent such a possibility, the circuit of FIG. 3 may be substituted for the relay circuit which is connected to the circuit 10 at point A in FIG. 1.

Referring to FIG. 3, a polarized relay 44 is connected to the point B in the circuit 10 of FIG. 1 and moves a switch 46 to its upper position when the craft is on the positive side of the beam and moves the switch to its lower position when the craft is on the negative side of the beam (see FIG. 2). The switch 46 is connected to the point A of FIG. 1 and has the summing amplifier 30 output signal applied to it. A diode 48 has its plate connected to the switch contact 50 and has its cathode connected to a slow-acting D.C. relay 52. Therefore, the relay 52 may be energized by only positive-going signals and, when energized, opens a switch 54 against the tension of a spring 56. A diode 58 has its cathode connected to the switch contact 60 and has its plate connected to a slow-acting D.C. relay 62. Therefore, the relay 62 may be energized by only negative-going signals, and when energized, opens the switch 54 against the tension of a spring 64.

With the apparatus of FIG. 3 connected to the points A and B of FIG. 1, approaches to the beam center along courses $v$, $w$ and $x$, are the same as when the relay circuit of FIG. 1 is employed with the circuit 10. With the craft on the curve $v$ between points $q$ and $q$, the switch 46 is in its lower position and negative-going pulses are applied through the diode 58 to the relay 62 which keeps the switch 54 open, thereby preventing the coupler from being engaged. At point $r$, however, the negative-going pulses disappears and the relay becomes deenergized, thereby allowing the switch 54 to close. As the displacement signal starts to decrease below the heading error signal, the summing amplifier 30 output signal starts to go positive as stated above. These pulses have no effect on the relay 62 and cause the craft to make a right turn (inbound).

With the craft on a curse $x$, for example, the summing amplifier 30 has no output signal because the heading error and displacement signals are equal. This causes the relay 62 to be deenergized, thereby engaging the craft radio coupler. However, the craft is not turned inbound until the craft displacement signal starts to fall below the heading error signal.

If the pilot closes the switch 38 when the craft is well within the beam, e.g. at position $m$, and is approaching the beam center at a large intercept angle, e.g. along an approach course $y$, the heading error signal will be much larger than the displacement signal. This will cause the summing amplifier 30 to produce large positive-going pulses which do not energize the relay 62 and yet cause the craft to make a sharp right turn inbound. If the pilot closes the switch 38 when the craft is at position $n$ and approaching the center of the beam along a course $z$, the switch 46 will be in its upper position and the summing amplifier 30 will produce negative-going pulses which will have no effect on the relay 52 but will cause the craft to turn left sharply into the beam.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In an automatic pilot for aircraft having radio responsive apparatus for controlling said automatic pilot to cause said craft to approach and maintain a selected radio course, the combination comprising engage means for rendering said radio responsive apparatus effective to control said autopilot, means for supplying a signal in accordance with the displacement of said craft from said radio defined course, means for supplying a signal in accordance with the rate of approach of said craft to said radio defined course, means responsive to both of said signals for producing a signal in accordance with the algebraic sum thereof, and means responsive to said sum signal for operating said engage means when said sum signal reaches a predetermined low value.

2. The apparatus as set forth in claim 1, wherein said predetermined low value corresponds to a substantially zero value.

3. In an automatic control system for aircraft including control means for controlling the craft to approach and thereafter maintain a radio defined course, the combination comprising means for supplying a signal in accordance with the displacement of the craft from said radio course, means for supplying a signal in accordance with the rate of approach of said craft to said course, summing means responsive to both of said signals for supplying an output signal in accordance with the algebraic sum thereof, and means responsive to said output signal for supplying said displacement and rate signals to said craft control means when said output signal has a substantially zero value.

4. Radio approach coupler apparatus for supplying signals to an aircraft automatic pilot whereby the autopilot may control the craft to approach and maintain a selected radio course, the combination comprising means for supplying a signal in accordance with the displacement of the craft from said radio course, means for supplying a signal in accordance with the rate of approach of the craft to said radio course, means responsive to said signals for supplying a signal in accordance with the algebraic sum thereof, and means coupled with said last mentioned means and responsive to a predetermined low value of said sum signal for rendering said approach coupler apparatus effective to control said automatic pilot.

5. In an automatic pilot for aircraft having radio responisve apparatus for controlling said automatic pilot to cause said craft to approach and maintain a selected radio course, the combination comprising engage means for rendering said radio responsive apparatus effective to control said autopilot, means responsive to measures of the displacement and rate of approach of said craft with respect to said radio course for supplying an output in accordance with the difference therebetween, and means responsive to said output signal for operating said engage means when said difference signal reaches a predetermined low value.

6. Apparatus for use in engaging the radio beam coupling apparatus of an aircraft autopilot comprising means producing a signal proportional to the displacement of said aircraft from a radio defined course, means producing a signal proportional to the rate of approach of said aircraft to said radio defined course, means responsive to both said signals to produce a signal proportional to the algebraic sum thereof, and means responsive to said sum signal when said sum signal is approximately zero to engage said coupling apparatus.

7. Apparatus for directing the flight of an aircraft to a radio defined course, comprising means producing a signal proportional to the craft displacement from the course, means producing a signal proportional to the craft heading relative to said course, an autopilot, and means responsive to both said signals producing a signal proportional to their difference, said means receiving both said signals applying said difference signal to the bank control channel of said autopilot when said difference signal is approximately zero.

8. Radio beam coupling apparatus for an aircraft equipped with an autopilot comprising means producing a signal proportional to the craft displacement from a preselected radio beam, means producing a signal proportional to the craft approach rate to said beam, means comparing both said signals and producing signals representing their difference, switch means coupled to the bank control channel of said autopilot and receiving said difference signals, and means responsive when said difference signals are at some predetermined low level to close said switch means and thereby apply said difference signals to the autopilot bank control channel.

9. Apparatus for use in engaging the radio beam coupling apparatus of an autopilot comprising means producing a beam displacement signal, means producing a signal proportional to the craft approach rate to said beam, means limiting said approach rate signal to a magnitude not greater than the magnitude of the maximum displacement signal, means comparing said displacement and limited approach rate signals producing a signal representing their difference, and means responsive when said difference signal represents approximately zero to engage the beam coupling apparatus.

10. Radio beam coupling apparatus for an autopilot-equipped aircraft comprising means providing a beam displacement signal, means providing a signal proportional to the heading of said craft relative to said beam, means operable with said last-mentioned means to limit the magnitude of said heading signal to a value not greater than the magnitude of said displacement signal, means receiving both said signals and producing a signal representing their difference, and means responsive when said difference signal represents substantially zero to connect the coupling apparatus to the craft autopilot.

11. Radio beam coupling apparatus for an aircraft equipped with an autopilot comprising means producing a signal representing the bearing of a selected radio beam, means producing a signal representing the true heading of said craft, means receiving both said signals and producing a signal representing their differences, means producing a limited signal representing the craft displacement from said beam, means limiting the magnitude of said difference signal to approximately the same value as said displacement signal, means receiving said displacement and difference signals and producing a signal representing their difference, and means responsive when said last mentioned difference signal represents approximately zero to connect the coupling apparatus to the craft autopilot bank control channel.

12. Automatic radio beam coupling apparatus for an autopilot equipped aircraft comprising means producing a signal proportional to the craft displacement from the course, means producing a signal proportional to the craft heading relative to said course, means comparing both said signals and producing a signal proportional to their difference, normally closed switch means connecting said apparatus to said autopilot bank control channel, and means responsive when said displacement signal is greater than said relative heading signal to open said switch and thereby disconnect said bank control channel from said coupling apparatus.

13. Radio beam coupling apparatus for an aircraft equipped with an autopilot comprising means producing a signal proportional to the craft displacement from a preselected radio beam, means producing a signal proportional to the craft approach rate to said beam, means comparing both said signals and producing a signal representing their difference, switch means connecting said coupling apparatus to the bank control channel of said autopilot, and means responsive only when said approach rate signal is greater than said displacement signal to close said switch means.

14. Apparatus for use in engaging radio responsive apparatus for controlling an aircraft autopilot so that the autopilot directs the craft to a radio defined course comprising means producing a signal proportional to the displacement of said aircraft from a radio defined course, means producing a signal proportional to the rate of approach of said aircraft to said radio defined course, means comparing both said signals to produce an error signal, switch means connecting said radio responsive apparatus to the bank control channel of said autopilot, first means responsive to an error signal having a first sense to open said switch means, second means responsive to an error signal having a second sense to open said switch means, and means responsive to the sense of said displacement signal to apply said error signal to said first means when said displacement signal has said first sense and apply said displacement signal to said second means when said displacement signal has said second sense.

15. Apparatus of claim 14 including means limiting said displacement signal and the signal proportional to the craft rate of approach to the same value.

References Cited in the file of this patent

UNITED STATES PATENTS 2,800,292     Moseley _____ July 23, 1957